United States Patent
Kim et al.

(10) Patent No.: US 8,774,279 B2
(45) Date of Patent: Jul. 8, 2014

(54) APPARATUS FOR DECODING MOTION INFORMATION IN MERGE MODE

(71) Applicant: IBEX PT Holdings Co., Ltd., Seoul (KR)

(72) Inventors: Kwangje Kim, Seoul (KR); Hyunoh Oh, Gwacheon si (KR)

(73) Assignee: IBEX PT Holdings Co., Ltd., Seoul (KR)

( * ) Notice: Subject to any disclaimer, the term of this patent is extended or adjusted under 35 U.S.C. 154(b) by 27 days.

(21) Appl. No.: 13/743,086

(22) Filed: Jan. 16, 2013

(65) Prior Publication Data

US 2013/0148735 A1 Jun. 13, 2013

Related U.S. Application Data

(63) Continuation of application No. PCT/KR2012/000523, filed on Jan. 20, 2012.

(30) Foreign Application Priority Data

Aug. 29, 2011 (KR) .................. 10-2011-0086524

(51) Int. Cl.
*H04N 7/12* (2006.01)

(52) U.S. Cl.
USPC ............ 375/240.16; 375/240.25; 375/240.26; 375/240.12; 375/240.15; 382/233; 382/235; 382/238; 382/236

(58) Field of Classification Search
USPC ............ 375/240.16, 240.25, 240.26, 240.12, 375/240.15; 382/233, 235, 238, 236
See application file for complete search history.

(56) References Cited

U.S. PATENT DOCUMENTS

| | | | |
|---|---|---|---|
| 7,876,828 B2 | 1/2011 | Lee et al. | |
| 2007/0040935 A1 | 2/2007 | Lee et al. | |
| 2012/0263231 A1* | 10/2012 | Zhou | 375/240.12 |
| 2012/0263235 A1* | 10/2012 | Sugio et al. | 375/240.16 |
| 2013/0022122 A1* | 1/2013 | Oh | 375/240.16 |
| 2013/0101042 A1* | 4/2013 | Sugio et al. | 375/240.16 |
| 2013/0107959 A1* | 5/2013 | Park et al. | 375/240.15 |

FOREIGN PATENT DOCUMENTS

| | | |
|---|---|---|
| JP | 2006-217644 A | 8/2006 |
| JP | 2011-151775 A | 8/2011 |
| KR | 10-2006-0012440 A | 2/2006 |
| KR | 10-2006-0096514 A | 9/2006 |
| KR | 10-2007-0020994 A | 2/2007 |
| KR | 10-2011-0071047 A | 6/2011 |
| WO | 99/53438 A2 | 10/1999 |

* cited by examiner

*Primary Examiner* — Shawn An
(74) *Attorney, Agent, or Firm* — Birch, Stewart, Kolasch & Birch, LLP

(57) ABSTRACT

Disclosed is an apparatus for decoding motion information in merge mode for reconstructing a moving picture signal coded at a low data rate while maintaining a high quality of an image. The apparatus for decoding motion information in merge mode discloses the position of a merge mode candidate and the configuration of a candidate in order to predict motion information in merge mode efficiently. Furthermore, a merge candidate indicated by the merge index of a current block can be efficiently reconstructed irrespective of a network environment by adaptively generating a merge candidate based on the number of valid merge candidate.

5 Claims, 9 Drawing Sheets

APPARATUS FOR DECODING MOTION INFORMATION IN MERGE MODE

This application is a Bypass Continuation of PCT International Application No. PCT/KR2012/000523 filed on Jan. 20, 2012, which claims priority under 35 U.S.C. §119(a) to Patent Application No. 10-2011-0086524 filed in the Republic of Korea on Aug. 29, 2011. The entire contents of each of the above documents is hereby expressly incorporated by reference into the present application.

TECHNICAL FIELD

The present invention relates to an apparatus for decoding motion information and, more particularly, to an apparatus for decoding motion information in merge mode for reconstructing motion information coded in merge mode.

BACKGROUND ART

Lots of techniques for effectively compressing a moving picture signal while maintaining the quality of an image have been proposed. In particular, an inter-prediction coding method, that is, a method of extracting a block similar to a current block from a previous picture and coding a difference between the extracted block and the current block, is one of the most effective methods in compressing an image.

In the case of the inter-prediction coding method, however, motion information corresponding to each block must be additionally transmitted instead of coding a residual block and transmitting the coded residual block. For this reason, another image compression method is to reduce the amount of data by effectively coding motion information.

As the size of a prediction block and the number of pictures to be referred become diverse, the amount of data of a residual block is reduced, whereas the amount of motion information to be transmitted (e.g., a motion vector and a reference picture index) is gradually increased.

Accordingly, there is a need for an apparatus capable of reducing the amount of motion information to be transmitted more effectively.

DISCLOSURE

Technical Problem

The present invention provides an apparatus for decoding motion information in merge mode for effectively reconstructing motion information coded in merge mode.

Technical Solution

The apparatus for decoding motion information in merge mode according to the present invention includes a merge predictor index decoding unit configured to reconstruct the merge predictor index of a current block using a received merge codeword; a spatial merge candidate derivation unit configured to derive the spatial merge candidate of the current block; a temporal merge candidate configuration unit configured to generate the temporal merge candidate of the current block; a merge candidate generation unit configured to generate a merge candidate when the number of valid merge candidates of the current block is smaller than a predetermined number; a merge predictor selection unit configured to generate a list of merge candidates using the spatial merge candidate derived by the merge candidate derivation unit, the temporal merge candidate generated by the temporal merge candidate configuration unit, and the merge candidate generated by the merge candidate generation unit and select a merge predictor based on the merge predictor index reconstructed by the merge predictor index decoding unit; and a motion information generation unit configured to generate the reference picture index and motion vector of a merge candidate, selected by the merge predictor selection unit, as the reference picture index and motion vector of the current block.

Advantageous Effects

In accordance with the present invention, the merge predictor index of a current block is reconstructed and the spatial merge candidate and the temporal merge candidate of the current block are generated, using a received merge codeword. If the number of valid merge candidates of the current block is smaller than a predetermined number, a list of merge candidates is made by generating the merge candidates. Furthermore, a merge predictor is selected based on the reconstructed merge predictor index. Accordingly, there are advantages in that a decoding speed can be increased and motion information can be efficiently decoded because the number of merge candidates is fixed and one decoding table is used.

MODE FOR INVENTION

Figure 1:
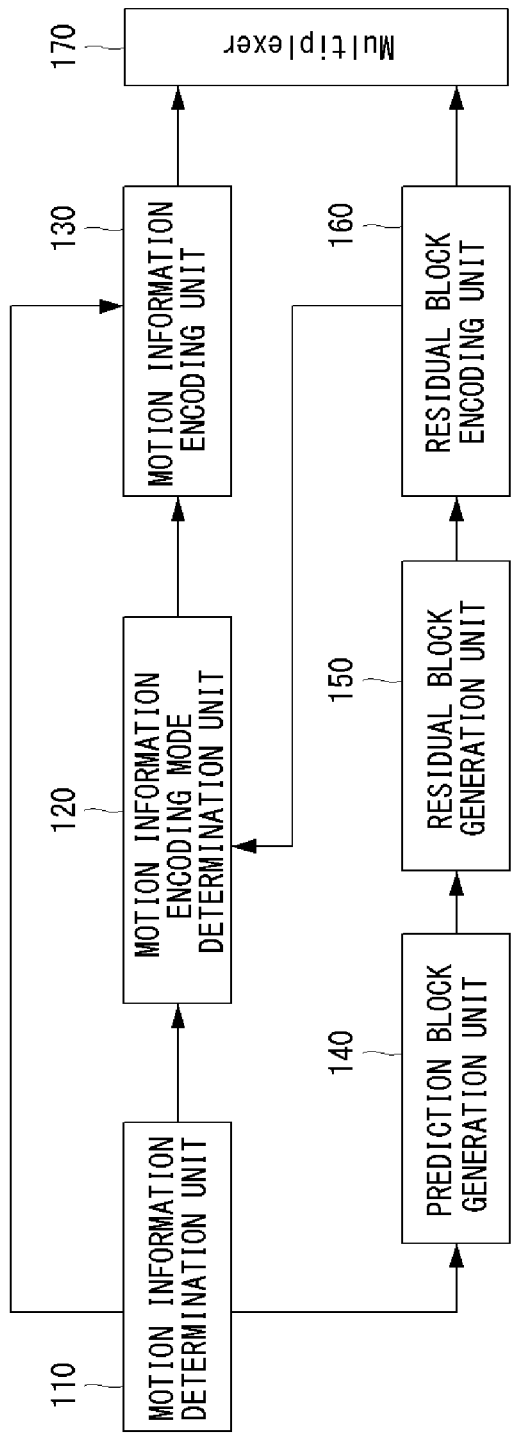
FIG. 1 is a block diagram of an inter-prediction encoding apparatus according to the present invention.

FIG. 1 is a block diagram of an inter-prediction encoding apparatus according to the present invention.

Referring to FIG. 1, the inter-prediction encoding apparatus includes a motion information determination unit 110, a motion information encoding mode determination unit 120, a motion information encoding unit 130, a prediction block generation unit 140, a residual block generation unit 150, a residual block encoding unit 160, and a multiplexer 170.

The motion information determination unit 110 determines motion information of a current block. The motion information includes a reference picture index and a motion vector. The reference picture index indicates any one of previously coded and reconstructed pictures. If a current block is encoded using uni-prediction, the reference picture index indicates one of reference pictures that belong to a list 0 L0. In contrast, if a current block is encoded using bi-prediction, the reference picture index may indicate one of the reference pictures included in a list 0 L0 and one of the reference pictures included in a list 1 L1. Furthermore, if a current block is encoded using bi-prediction, the reference picture index may indicate one or two pictures of the reference pictures included in a complex list LC generated by combining a list 0 and a list 1.

The motion vector indicates a position of a prediction block within a picture indicated by each reference picture index. The motion vector may be a pixel unit (e.g., an integer pixel unit), and may also be a sub-pixel unit. For example, the motion vector can have a resolution of a ½, ¼, ⅛, or 1/16 pixel. If a motion vector is not an integer pixel unit, a prediction block is generated from integer pixels.

The motion information encoding mode determination unit 120 determines whether motion information of a current block will be encoded in skip mode, merge mode, or AMVP mode.

Skip mode is applied when a skip candidate having the same motion information as a current block is present and a residual signal is 0. Furthermore, skip mode is applied when a current block has the same size as a coding unit. The current block can be considered to be a prediction unit.

Merge mode is applied when a merge candidate having the same motion information as a current block is present. Merge mode is applied when a current block has a different size from a coding unit or when a residual signal is present if a current block has the same size as a coding unit. A merge candidate can be identical with a skip candidate.

AMVP mode is applied when skip mode and merge mode are not applied. An AMVP candidate that has the most similar motion vector as a current block is selected as an AMVP predictor.

The motion information encoding unit 130 encodes motion information in accordance with a method determined by the motion information encoding mode determination unit 120. If motion information encoding mode is skip mode or merge mode, the motion information encoding unit 130 performs a motion vector encoding process. If motion information encoding mode is AMVP mode, the motion information encoding unit 130 performs an AMVP encoding process.

The prediction block generation unit 140 generates a prediction block using motion information of a current block. If a motion vector is an integer pixel unit, the prediction block generation unit 140 generates the prediction block of a current block by copying a block corresponding to a position that is indicated by a motion vector within a picture indicated by a reference picture index.

If a motion vector is not an integer pixel unit, however, the prediction block generation unit 140 generates pixels of a prediction block from integer pixels within a picture indicated by a reference picture index. In this case, in the case of a luminance pixel, a prediction pixel can be generated using an 8-tap interpolation filter. In the case of a chrominance pixel, a prediction pixel can be generated using a 4-tap interpolation filter.

The residual block generation unit 150 generates a residual block using a current block and the prediction block of the current block. If a current block has a size of 2N×2N, the residual block generation unit 150 generates a residual block using the current block and a prediction block having a size of 2N×2N corresponding to the current block. If a current block used for prediction has a size of 2N×N or N×2N, the residual block generation unit 150 can obtain a prediction block for each of two 2N×N blocks that form the size of 2N×2N and then generate a final prediction block having a size of 2N×2N using the two 2N×N prediction blocks. Furthermore, the residual block generation unit 150 may generate a residual block having a size of 2N×2N using a prediction block having a size of 2N×2N. Pixels, located near a boundary of two prediction blocks each having the size of 2N×N, can be overlap-smoothed in order to solve discontinuity at the boundary.

The residual block encoding unit 160 classifies a generated residual block into one or more transform units. Furthermore, each of the transform units is encoded by performing transform coding, quantization, and entropy coding. Here, a size of the transform unit can be determined by a quadtree method depending on a size of the residual block.

The residual block encoding unit 160 transforms a residual block, generated by an inter-prediction method, using an integer-based transform matrix. The transform matrix is an integer-based DCT matrix. The residual block encoding unit 160 uses a quantization matrix in order to quantize the coefficients of the residual block transformed by the transform matrix. The quantization matrix is determined by a quantization parameter. The quantization parameter is determined for each coding unit having a predetermined size or greater. The predetermined size can be 8×8 or 16×16. Accordingly, if a current coding unit is smaller than the predetermined size, only the quantization parameter of a first coding unit in coding order, from among a plurality of coding units within the predetermined size, is encoded and the quantization parameters of the remaining coding units do not need to be encoded because they are the same as the quantization parameter of the first coding unit. Furthermore, the coefficients of the transform block are quantized using the determined quantization parameter and a quantization matrix determined depending on prediction mode.

A quantization parameter determined for each coding unit having the predetermined size or greater is encoded by performing prediction coding using the quantization parameter of a coding unit that neighbors a current coding unit. Quantization parameters can be searched for in order of the left coding unit and the upper coding unit of the current coding unit, and a quantization parameter predictor of a current coding unit can be generated using one or two searched valid quantization parameters. For example, a valid quantization parameter retrieved first as described above can be determined as a quantization parameter predictor. In another embodiment, quantization parameters can be searched for in order of a left coding unit and a coding unit right before in coding order, and a valid quantization parameter retrieved first can be determined as a quantization parameter predictor.

The coefficients of a quantized transform block are scanned and transformed into one-dimensional quantization coefficients. A scanning method can be set differently based on entropy coding mode. For example, in the case of Context-Based Adaptive Binary Arithmetic Coding (CABAC), quantization coefficients encoded using inter-prediction can be scanned using a predetermined method (e.g., a zigzag scan or a diagonal raster scan). In contrast, in the case of CAVLC, quantization coefficients encoded using inter-prediction can be scanned using a different method from the aforementioned method. For example, the scanning method can be determined based on the zigzag scan in the case of inter and can be determined based on intra-prediction mode in the case of intra. Furthermore, a coefficient scanning method may be determined differently based on the size of a transform unit. A scan pattern may vary dbased on a directional intra-prediction mode. The quantization coefficients are scanned in reverse order.

The multiplexer 170 multiplexes motion information encoded by the motion information encoding unit 130 and residual signals encoded by the residual block encoding unit 160. The motion information may include different information depending on coding mode. That is, in skip or merge mode, the motion information includes only an index indicative of a predictor. In contrast, in AMVP mode, the motion information includes a reference picture index, a differential motion vector, and an AMVP index of a current block.

Figure 2:
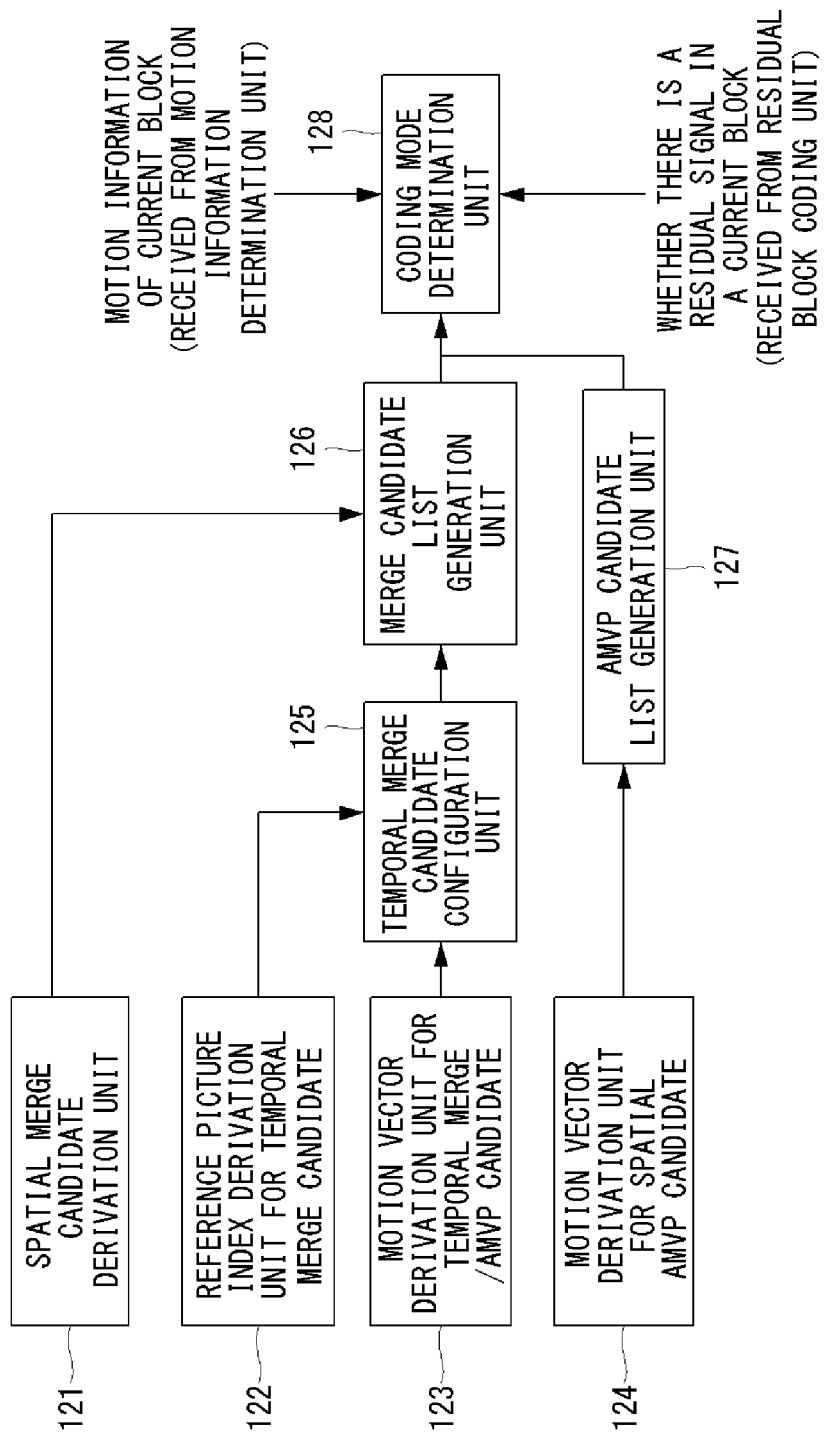
FIG. 2 is a block diagram of a motion information encoding mode determination unit according to the present invention.

FIG. 2 is a block diagram of the motion information encoding mode determination unit 120 according to the present invention.

The motion information encoding mode determination unit 120 according to the present invention includes a spatial merge candidate derivation unit 121, a reference picture index derivation unit 122 for a temporal merge candidate, a motion vector derivation unit 123 for a temporal merge/AMVP candidate, a motion vector derivation unit 124 for a spatial AMVP candidate, a temporal merge candidate configuration unit 125, a merge candidate list generation unit 126, an AMVP candidate list generation unit 127, and a coding mode determination unit 128.

Figure 3:
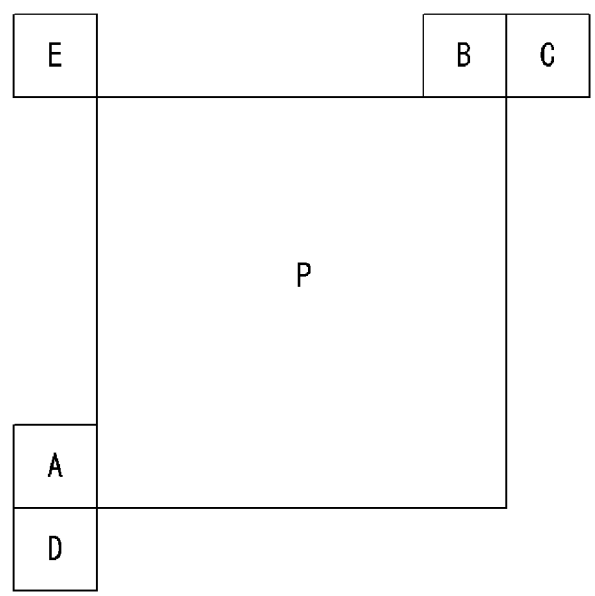
FIG. 3 is a diagram showing the position of a merge candidate in accordance with an embodiment of the present invention.

The spatial merge candidate derivation unit 121 sets valid motion information on blocks neighboring a current block as spatial merge candidates. Four candidates of the left block (e.g., a block A) of a current block, the upper block (e.g., a block B) of the current block, the upper right block (e.g., a block C) of the current block, the lower left block (e.g., a block D) of the current block, and the upper left block (e.g., a block E) of the current block can become the spatial merge candidates, as shown in FIG. 3. In this case, the block E can be used when one or more of the blocks A, B, C, and D are not valid.

Furthermore, the left block (e.g., a block A') of the current block, the upper block (e.g., a block B') of the current block, and the corner block (e.g., any one of the blocks C, D, and E) of the current block can be set as the spatial merge candidates. The corner block is the first block that is valid when scanning is performed in order of the upper right block (e.g., a block C) of the current block, the lower left block (e.g., a block D) of the current block, and the upper left block (e.g., a block E) of the current block.

Furthermore, two candidates that are valid when scanning is performed in order of the left block (e.g., a block A') of the current block, the upper block (e.g., a block B') of the current block, the upper right block (e.g., a block C) of the current block, the lower left block (e.g., a block D) of the current block, and the upper left block (e.g., a block E) of the current block can become the spatial merge candidates.

Here, the left block A' can be a block that does not neighbor the block D, but neighbors the block E. Likewise, the upper block B' can be a block that does not neighbor the block C, but neighbors the block E.

The reference picture index derivation unit 122 for a temporal merge candidate obtains a reference picture index for the temporal merge candidates of a current block. The reference picture index of one of blocks (e.g., prediction units) that spatially neighbor a current block can be set as the reference picture index for the temporal merge candidates.

In order to obtain the reference indices of the temporal merge candidates of the current block, some or all of the reference picture indices of the left block A, the upper block B, the upper right block C, the lower left block D, and the upper left block E of the current block can be used.

For example, the reference picture indices of the left block A, the upper block B, and a corner block (e.g., any one of the blocks C, D, and E) of the current block can be used. In this case, the reference picture index of a block that is valid first when blocks are scanned in order of the upper right block C, the lower left block D, and the upper left block E can be determined as the reference picture index of the corner block. For example, a reference picture index having the highest frequency, from among valid reference picture indices of the reference picture indices, can be set as a reference picture index of a temporal skip candidate. If the number of reference picture indices having the highest frequency, from among valid candidates, is plural, a reference picture index having a minimum value, from among the plurality of reference picture indices, can be set as a reference picture index for the temporal skip candidate.

In order to obtain the reference indices of the temporal merge candidates of the current block, the reference picture indices of three blocks that are valid when blocks are scanned in order of the left block A, the upper block B, the upper right block C, the lower left block D, and the upper left block E of the current block may be used. Although three or more valid reference picture indices are illustrated as being used, all the valid reference picture indices may be used or only a reference picture index at a predetermined position may be used. If there is no valid reference picture index, the reference picture index may be set to 0.

The motion vector derivation unit 123 for a temporal merge/AMVP candidate determines a picture to which a temporal merge candidate block belongs (hereinafter referred to as a temporal merge candidate picture). The temporal merge candidate picture can be set as a picture having a reference picture index of 0. In this case, if a slice type is P, the temporal merge candidate picture is set as the first picture of a list 0 (i.e., a picture having an index of 0). If a slice type is B, the temporal merge candidate picture is set as the first picture of a reference picture list indicated by a flag, the flag being indicative of a temporal merge candidate list in a slice header. For example, the temporal merge candidate picture can be set as a picture in a list 0 when the flag is 1, and as a picture in a list 1 when the flag is 0.

The motion vector derivation unit 123 obtain a temporal merge candidate block within the temporal merge candidate picture. One of a plurality of corresponding blocks corresponding to a current block within the temporal merge candidate picture can be selected as the temporal merge candidate block. In this case, the order of priority can be assigned to the plurality of corresponding blocks, and a first valid corresponding block can be selected as the temporal merge candidate block based on the order of priority.

For example, a lower left corner block BR_C that neighbors a block corresponding to a current block within the temporal merge candidate picture or a lower left block BR within a block corresponding to a current block within the temporal merge candidate picture can be set as a first candidate block, and a block C1 that includes an upper left pixel at the central position of a block corresponding to a current block within the temporal merge candidate picture or a block C2 that includes a lower right pixel at the central position of a block corresponding to a current block within the temporal merge candidate picture can be set as a second candidate block.

When the first candidate block is valid, the temporal merge candidate block can be set as the first candidate block. When the first candidate block is not valid and the second candidate block is valid, the temporal merge candidate block can be set as the second candidate block. In another embodiment, only the second candidate block can be used based on the position of a current block. For example, if a current block is adjacent to the lower boundary of a slice or the lower boundary of an LCU, only the second candidate block can be used. If the second candidate block is not present, the temporal merge candidate is determined not to be valid.

After the temporal merge candidate block is determined, a motion vector of a temporal merge candidate is set as a motion vector of the temporal merge candidate block.

Meanwhile, the temporal merge candidate may not be adaptively used depending on the size of a current block. For example, in the case of a 4×4 block, the temporal merge candidate may not be used in order to reduce complexity.

The motion vector derivation unit 124 for a spatial AMVP candidate can select one of the left block (e.g., a block A) and the lower left block (e.g., a block D) of a current block as a left spatial candidate and can select one of the upper block (e.g., a block B) of the current block, the upper right block (e.g., a block C) of the current block, and the upper left block (e.g., block E) of the current block as an upper spatial candidate. Here, a motion vector that is first valid when blocks are scanned in predetermined order is determined as the left or upper spatial candidate. The predetermined order can be order of the block A and the block D or a reverse order thereof in the case of a left block and can be order of the block B, the block C, and the block E or order of the block C, the block B, and the block E in the case of an upper block. The valid motion vector can be a motion vector that satisfies a predetermined condition. The predetermined condition is set based on motion information of a current block. An upper spatial candidate may not be set based on a left spatial candidate.

The temporal merge candidate configuration unit 125 generates a temporal merge candidate using a reference picture index of the temporal merge candidate obtained by the reference picture index derivation unit 122 for the temporal merge candidate and a motion vector of the temporal merge candidate obtained by the motion vector derivation unit 123 for the temporal merge/AMVP candidate.

The merge candidate list generation unit 126 generates a list of merge candidates in predetermined order using valid merge candidates. If a plurality of merge candidates has the same motion information (e.g., the same motion vector and the same reference picture index), merge candidates having lower order of priority are deleted from the list. For example, the predetermined order can be order of blocks A, B, Col, C, and D. Here, Col means a temporal merge candidate. If one or more of the blocks A, B, C, and D are not valid, motion information of a valid block E can be inserted into the position of the invalid first block. Furthermore, the motion information of the valid block E can be inserted into the last position.

Meanwhile, if the number of merge candidates is smaller than a predetermined number, a merge candidate can be generated. The added merge candidate can be generated by combining motion information on two valid merge candidates. For example, a merge candidate can be generated by combining a reference picture index of a temporal merge candidate and a valid spatial motion vector of a spatial merge candidate. If a plurality of merge candidates can be generated, the generated merge candidates can be added to a list in predetermined order. A merge candidate generated by combining the reference picture index of a temporal merge candidate and the motion vector of a spatial merge candidate can be first added to the list. If the number of merge candidates to be generated is insufficient, a merge candidate having a motion vector of 0 and a reference picture index of 0 may be added. The predetermined number can be determined for each picture or slice.

The AMVP candidate list generation unit 127 generates a list of AMVP candidates in predetermined order using valid AMVP candidates. If a plurality of AMVP candidates has the same motion vector (but reference pictures need not to be the same), AMVP candidates having lower order of priority are deleted from the list. The predetermined order can be order of the left side, the upper side, and Col or can be order of Col, the left side, and the upper side.

Furthermore, the AMVP candidate list generation unit 127 determines whether it is necessary to generate an AMVP candidate or not. Assuming that the number of AMVP candidates is set to a fixed value in the above AMVP candidate configuration, if the number of valid AMVP candidates is smaller than the fixed value, an AMVP candidate is generated. Furthermore, the generated AMVP candidate is added to a position next to an AMVP candidate having the lowest order of priority in the list. The added AMVP candidate can be a candidate having a motion vector of 0.

The coding mode determination unit 128 determines whether motion information of a current block will be encoded in skip mode, merge mode, or AMVP mode.

Skip mode is applied when there is a skip candidate having the same motion information as a current block and a residual signal is 0. Furthermore, skip mode is applied when a current block has the same size as a coding unit. The current block can be considered to be a prediction unit.

Merge mode is applied when a merge candidate having the same motion information as a current block is present. Merge mode is applied when a current block has a different size from a coding unit or when a residual signal is present if a current block has the same size as a coding unit. A merge candidate can be identical with a skip candidate.

AMVP mode is applied when skip mode and merge mode are not applied. An AMVP candidate that has the most similar motion vector as a current block is selected as an AMVP predictor.

Figure 4:
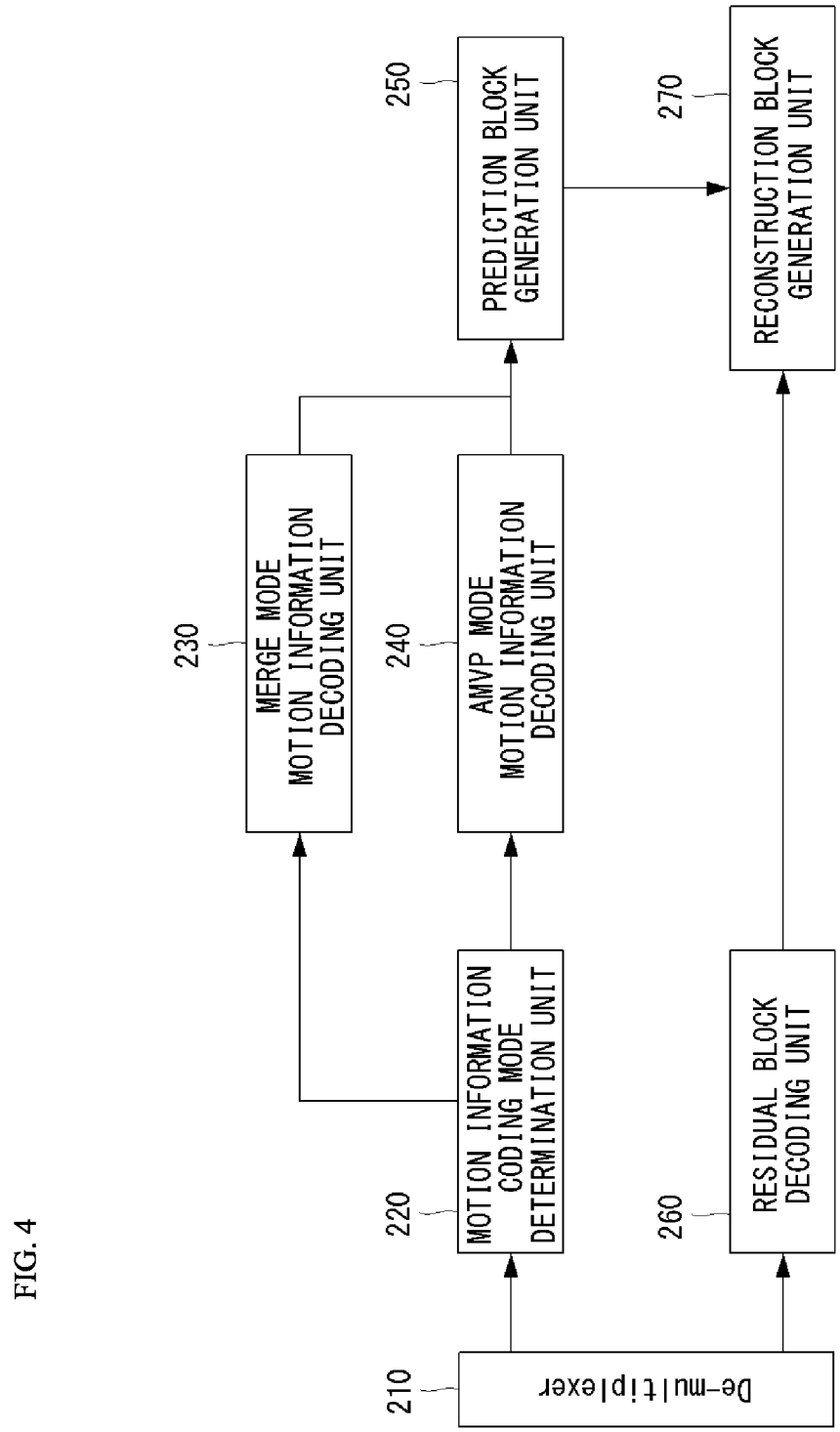
FIG. 4 is a block diagram of an inter-prediction decoding apparatus according to the present invention.

FIG. 4 is a block diagram of an inter-prediction decoding apparatus 200 according to the present invention.

The inter-prediction decoding apparatus 200 according to the present invention includes a demultiplexer 210, a motion information coding mode determination unit 220, a merge mode motion information decoding unit 230, an AMVP mode motion information decoding unit 240, a prediction block generation unit 250, a residual block decoding unit 260, and a reconstruction block generation unit 270.

The demultiplexer 210 demultiplexes coded motion information of a current block and coded residual signals from a received bit stream. The demultiplexer 210 transmits the demultiplexed motion information to the motion information coding mode determination unit 220 and transmits the demultiplexed residual signals to the residual block decoding unit 260.

The motion information coding mode determination unit 220 determines motion information coding mode of the current block. If skip_flag included in a received bit stream has a value of 1, the motion information coding mode determination unit 220 determines that motion information of the current block has been encoded in skip mode. If the skip_flag included in the received bit stream has a value of 0 and motion information received from the demultiplexer 210 has only a merge index, the motion information coding mode determination unit 220 determines that motion information of the current block has been encoded in merge mode. If the skip_flag included in the received bit stream has a value of 0 and motion information received from the demultiplexer 210 has a reference picture index, a differential motion vector, and an AMVP index, the motion information coding mode determination unit 220 determines that motion information of the current block has been encoded in AMVP mode.

The merge mode motion information decoding unit 230 is activated when the motion information coding mode determination unit 220 determines that motion information of the current block has been encoded in skip mode or merge mode.

The AMVP mode motion information decoding unit 240 is activated when the motion information coding mode determination unit 220 determines that motion information of a current block has been encoded in AMVP mode.

The prediction block generation unit 250 generates the prediction block of the current block using motion information reconstructed by the merge mode motion information decoding unit 230 or the AMVP mode motion information decoding unit 240. If a motion vector has an integer pixel unit, the prediction block generation unit 250 generates the prediction block of the current block by copying a block corresponding to a position that is indicated by a motion vector within a picture indicated by a reference picture index. If a motion vector does not have an integer pixel unit, however, the prediction block generation unit 250 generates pixels of a prediction block from an integerpixels within a picture indicated by a reference picture index. In the case of a luminance pixel, a prediction pixel can be generated using an 8-tap interpolation filter. In the case of a chrominance pixel, a prediction pixel can be generated using a 4-tap interpolation filter.

The residual block decoding unit 260 performs entropy decoding on a residual signal. Furthermore, the residual block decoding unit 260 generates a two-dimensional quantized coefficient block by inversely scanning entropy-decoded coefficients. An inverse scanning method may vary based on an entropy decoding method. That is, the inverse scanning method of an inter-prediction residual signal in the case of decoding based on Context-Adaptive Binary Arithmetic Coding (CABAC) may be different from the inverse scanning method of an inter-prediction residual signal in the case of decoding based on Context-Based Adaptive Variable Length Coding (CAVLC). For example, a diagonal raster inverse-scan method can be used in the case of decoding based on CABAC, and a zigzag inverse-scan method can be used in the case of decoding based on CAVLC. Furthermore, the inverse scanning method may be determined based on a size of a prediction block.

The residual block decoding unit 260 inversely quantizes a generated coefficient block using an inverse quantization matrix. In order to derive the quantization matrix, a quantization parameter is reconstructed. A quantization step size is reconstructed for each coding unit having a predetermined size or greater. The predetermined size may be 8×8 or 16×16. Accordingly, if a current coding unit is smaller than the predetermined size, only the quantization parameter of the first coding unit in coding order, from among a plurality of coding units within the predetermined size, is reconstructed, and the quantization parameters of the remaining coding units do not need to be coded because they are the same as the quantization parameter of the first coding unit.

In order to reconstruct a quantization parameter determined for each coding unit having the predetermined size or greater, the quantization parameter of a coding unit neighboring a current coding unit is used. The first quantization parameter that is valid when scanning is performed in order of the left coding unit and the upper coding unit of a current coding unit can be determined as a quantization parameter predictor of the current coding unit. Furthermore, the first quantization parameter that is valid when scanning is performed in order of the left coding unit and the coding unit right before in coding order, of the current coding unit, can be determined as a quantization parameter predictor. The quantization parameter of a current prediction unit is reconstructed using the determined quantization parameter predictor and a differential quantization parameter.

The residual block decoding unit 260 reconstructs a residual block by inversely transforming the inversely quantized coefficient block.

The reconstruction block generation unit 270 generates a reconstruction block by adding a prediction block generated by the prediction block generation unit 250 and a residual block generated by the residual block decoding unit 260.

Figure 5:
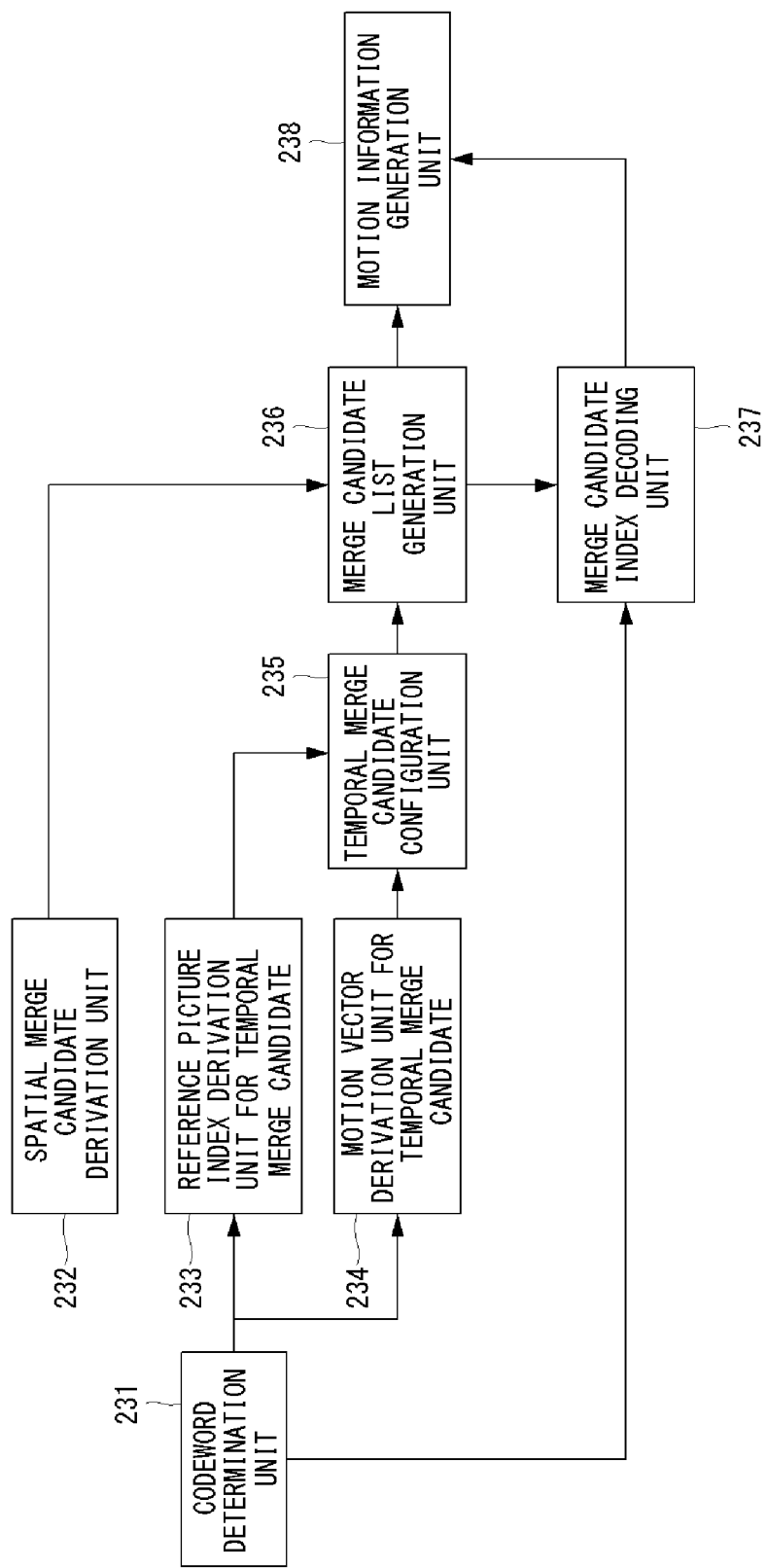
FIG. 5 is a block diagram of a merge mode motion information decoding unit in accordance with a first embodiment of the present invention.

FIG. 5 is a block diagram of the merge mode motion information decoding unit 230 in accordance with a first embodiment of the present invention.

The merge mode motion information decoding unit 230 in accordance with the first embodiment of the present invention includes a codeword determination unit 231, a spatial merge candidate derivation unit 232, a reference picture index derivation unit 233 for a temporal merge candidate, a motion vector derivation unit 234 for a temporal merge candidate, a temporal merge candidate configuration unit 235, a merge candidate list generation unit 236, a merge candidate index decoding unit 237, and a motion information generation unit 238. In this case, the number of merge candidates is not fixed.

The codeword determination unit 231 determines whether there is a codeword corresponding to a merge candidate index or not. If, as a result of the determination, a codeword corresponding to the merge candidate index is determined not to be present, the codeword determination unit 231 determines that one merge candidate is present or not present. If, as a result of the determination, one merge candidate is determined not to be present, motion information of a current block is reconstructed as motion information having a motion vector of 0 and a reference picture index of 0. If, as a result of the determination, one merge candidate is determined to be present, motion information of the current block is reconstructed as motion information of the merge candidate.

The spatial merge candidate derivation unit 232 sets valid motion information of a block that is adjacent to a current block as a spatial merge candidate. As shown in FIG. 3, four candidates of the left block (e.g., a block A) of a current block, the upper block (e.g., a block B) of the current block, the upper right block (e.g., a block C) of the current block, the lower left block (e.g., a block D) of the current block, and the upper left block (e.g., a block E) of the current block can be used for setting the spatial merge candidates. In this case, the block E can be used when one or more of the blocks A, B, C, and D are not valid.

Furthermore, the left block (e.g., a block A') of a current block, the upper block (e.g., a block B') of the current block, and the corner block (e.g., any one of the blocks C, D, and E) of the current block can be set as the spatial merge candidates. The corner block is the first block that is valid when scanning is performed in order of the upper right block (e.g., a block C), the lower left block (e.g., a block D) of the current block, and the upper left block (e.g., a block E) of the current block.

Furthermore, two candidates that are valid when scanning is performed in order of the left block (e.g., a block A') of the current block, the upper block (e.g., a block B') of the current block, the upper right block (e.g., a block C) of the current block, the lower left block (e.g., a block D) of the current block, and the upper left block (e.g., a block E) of the current block can be set as the spatial merge candidates.

Here, the left block A' can be a block that does not neighbor the block D, but neighbors the block E. Likewise, the upper block B' can be a block that does not neighbor the block C, but neighbors the block E.

In the aforementioned embodiments, motion information of merge candidates placed on the upper side of a current prediction unit, from among spatial merge candidates, can be differently set based on the position of the current prediction unit. For example, if the current prediction unit comes in contact with the upper boundary of an LCU, motion information of the upper prediction unit (e.g., a block B, C or E) of the current prediction unit can be its own motion information or motion information of a neighbor prediction unit. The motion information of the upper prediction unit can be determined as its own motion information or motion information (e.g., a reference picture index and a motion vector) of a neighbor prediction unit based on the size and position of the current prediction unit.

The reference picture index derivation unit 233 obtains the reference picture index of the temporal merge candidates of a current block. The reference picture index of the temporal merge candidate can be set as the reference picture index of one of blocks (i.e., prediction units) that spatially neighbor a current block. In another embodiment, the reference picture index of the temporal merge candidate can be set to 0.

In order to obtain the reference indices of the temporal merge candidates of a current block, some or all of the reference picture indices of the left block A, the upper block B, the upper right block C, the lower left block D, and the upper left block E of a current block can be used.

For example, the reference picture indices of the left block A, the upper block B, and the corner block (e.g., any one of the blocks C, D, and E) of a current block can be used. In this case, the reference picture index of the first block that is valid when scanning is performed in order of the upper right block C, the lower left block D, and the upper left block E can be determined as the reference picture index of the corner block. For example, a reference picture index having the highest frequency, from among valid reference picture indices of the reference picture indices, can be set as the reference picture index of a temporal skip candidate. If there is a plurality of reference picture indices having the highest frequency, from among valid candidates, a reference picture index having a minimum value, from among the plurality of reference picture indices, can be set as a reference picture index for a temporal skip candidate.

In order to obtain the reference indices of the temporal merge candidates of a current block, the reference picture indices of three blocks that are valid when scanning is performed in order of the left block A, the upper block B, the upper right block C, the lower left block D, and the upper left block E of a current block may be used. Although three or more valid reference picture indices are illustrated as being used, all the valid reference picture indices may be used or only a reference picture index at a predetermined position may be used. If there is no valid reference picture index, the reference picture index may be set to 0.

The motion vector derivation unit 234 determines a picture to which the temporal merge candidate block belongs (hereinafter referred to as a temporal merge candidate picture). The temporal merge candidate picture can be set as a picture having a reference picture index of 0. In this case, if a slice type is P, the temporal merge candidate picture is set as the first picture included in a list 0 (i.e., a picture having an index of 0). If a slice type is B, the temporal merge candidate picture is set as the first picture of a reference picture list indicated by a flag, the flag being indicative of a temporal merge candidate list in a slice header. For example, the temporal merge candidate picture can be set as a picture in a list 0 when the flag is 1 and as a picture in a list 1 when the flag is 0.

The motion vector derivation unit 234 obtains a temporal merge candidate block within the temporal merge candidate picture. One of a plurality of corresponding blocks corresponding to a current block within the temporal merge candidate picture can be selected as the temporal merge candidate block. In this case, the order of priority can be assigned to the plurality of corresponding blocks, and a first valid corresponding block can be selected as the temporal merge candidate block based on the order of priority.

For example, a lower left corner block BR_C that neighbors a block corresponding to a current block within the temporal merge candidate picture or a lower left block BR within a block corresponding to a current block within the temporal merge candidate picture can be set as a first candidate block, and a block C1 that includes an upper left pixel at the central position of a block corresponding to a current block within the temporal merge candidate picture or a block C2 that includes a lower right pixel at the central position of a block corresponding to a current block within the temporal merge candidate picture can be set as a second candidate block.

When the first candidate block is valid, the first candidate block can be set as the temporal merge candidate block. When the first candidate block is not valid and the second candidate block is valid, the temporal merge candidate block can be set as the second candidate block. In another embodiment, only the second candidate block can be used depending on the position of a current block. For example, if a current block neighbors the lower boundary of a slice or the lower boundary of an LCU, only the second candidate block can be used. If the second candidate block is not present, the temporal merge candidate is determined not to be valid.

After the temporal merge candidate prediction block is determined, the motion vector of a temporal merge candidate is set as the motion vector of the temporal merge candidate prediction block.

Meanwhile, the temporal merge candidate may not be adaptively used depending on the size of a current block. For example, in the case of a 4×4 block, the temporal merge candidate may not be used in order to reduce complexity.

The temporal merge candidate configuration unit 235 determines a reference picture index obtained by the reference picture index derivation unit 233 and a motion vector obtained by the motion vector derivation unit 234 as the reference picture index and the motion vector of a temporal merge candidate.

The merge candidate list generation unit 236 generates a list of merge candidates in predetermined order using valid merge candidates. If a plurality of merge candidates has the same motion information (e.g., the same motion vector and the same reference picture index), merge candidates having lower order of priority are deleted from the list. For example, the predetermined order can be order of blocks A, B, Col, C, and D. Here, Col means a temporal merge candidate. If one or more of the blocks A, B, C, and D are not valid, motion information of a valid block E can be inserted into the position of the invalid first block. Furthermore, the motion information of the valid block E can be inserted into the last position.

The merge candidate index decoding unit 237 selects a decoding table corresponding to the number of valid candidates obtained by the merge candidate list generation unit 236. Furthermore, the merge candidate index decoding unit 237 determines an index, corresponding to the merge candidate codeword within the decoding table, as the merge candidate index of a current block.

The motion information generation unit 238 selects a merge predictor, corresponding to the merge candidate index, from the list generated by the merge candidate list generation unit 236 and determines motion information (i.e., a motion vector and a reference picture index) of the selected merge predictor as motion information of a current block.

Figure 6:
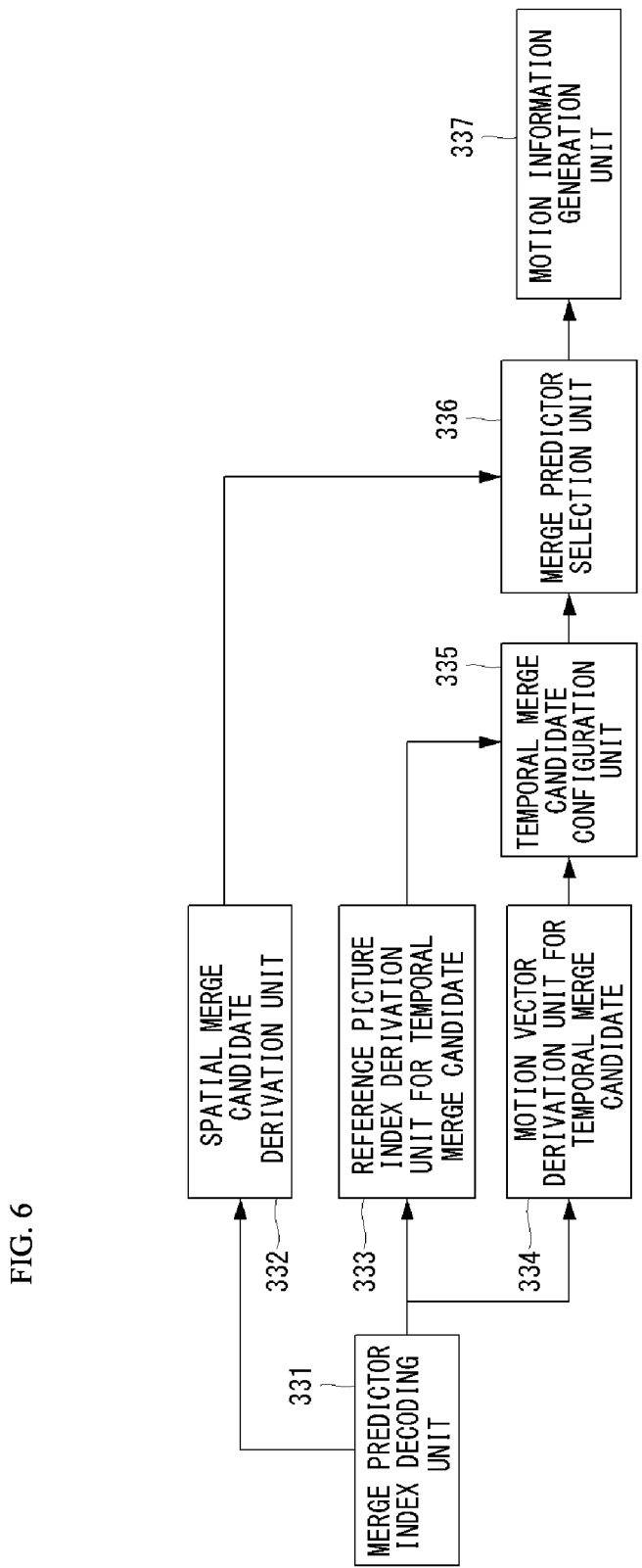
FIG. 6 is a block diagram of a merge mode motion information decoding unit in accordance with a second embodiment of the present invention.

FIG. 6 is a block diagram of the merge mode motion information decoding unit 230 in accordance with a second embodiment of the present invention.

The merge mode motion information decoding unit 230 in accordance with the second embodiment of the present invention includes a merge predictor index decoding unit 331, a spatial merge candidate derivation unit 332, a reference picture index derivation unit 333 for a temporal merge candidate, a motion vector derivation unit 334 for a temporal merge candidate, a temporal merge candidate configuration unit 335, a merge predictor selection unit 336, and a motion information generation unit 337. In this case, it is assumed that the number of merge candidates is fixed. The number of merge candidates can be fixed for each picture or slice.

The merge predictor index decoding unit 331 reconstructs a merge predictor index, corresponding to a received merge predictor codeword, using a predetermined table corresponding to the number of merge candidates.

The operation of the spatial merge candidate derivation unit 332 is the same as that of the spatial merge candidate derivation unit 232 shown in FIG. 5, and thus a description thereof is omitted.

The operations of the reference picture index derivation unit 333, the motion vector derivation unit 334, and the temporal merge candidate configuration unit 335 are the same as those of the reference picture index derivation unit 233, the motion vector derivation unit 234, and the temporal merge candidate configuration unit 235 shown in FIG. 5, respectively, and thus a description thereof is omitted.

The merge predictor selection unit 336 selects a merge candidate, corresponding to a merge predictor index reconstructed by the merge predictor index decoding unit 331, from a list of merge candidates and selects the selected merge candidate as the merge predictor of a current block. The list of merge candidates is generated using valid merge candidate. In this case, if a plurality of merge candidates has the same motion information (e.g., the same motion vector and the same reference picture index), merge candidates having lower order of priority are deleted from the list. For example, the predetermined order can be order of blocks A, B, Col, C, and D. Here, Col means a temporal merge candidate. However, if one or more of the blocks A, B, C, and D are not valid, motion information of a valid block E can be inserted into the position of the invalid first block. Furthermore, the motion information of the valid block E can be inserted into the last position.

Meanwhile, if the number of merge candidates is smaller than a predetermined number, a merge candidate can be generated. The added merge candidate can be generated by combining motion information of two valid merge candidates. For example, a merge candidate can be generated by combining the reference picture index of a temporal merge candidate and the valid spatial motion vector of a spatial merge candidate. If a plurality of merge candidates can be generated, the generated merge candidates can be added to a list in predetermined order. A merge candidate generated by combining the reference picture index of a temporal merge candidate and the motion vector of a spatial merge candidate can be first added to a list. If the number of merge candidates to be generated is insufficient, a merge candidate having a motion vector of 0 and a reference picture index of 0 may be added. The predetermined number can be determined for each picture or slice.

The motion information generation unit 337 selects a merge predictor, corresponding to the merge candidate index, from the list generated by the merge candidate list generation unit 236 and determines motion information (i.e., a motion vector and a reference picture index) of the selected merge predictor as motion information of a current block.

Figure 7:
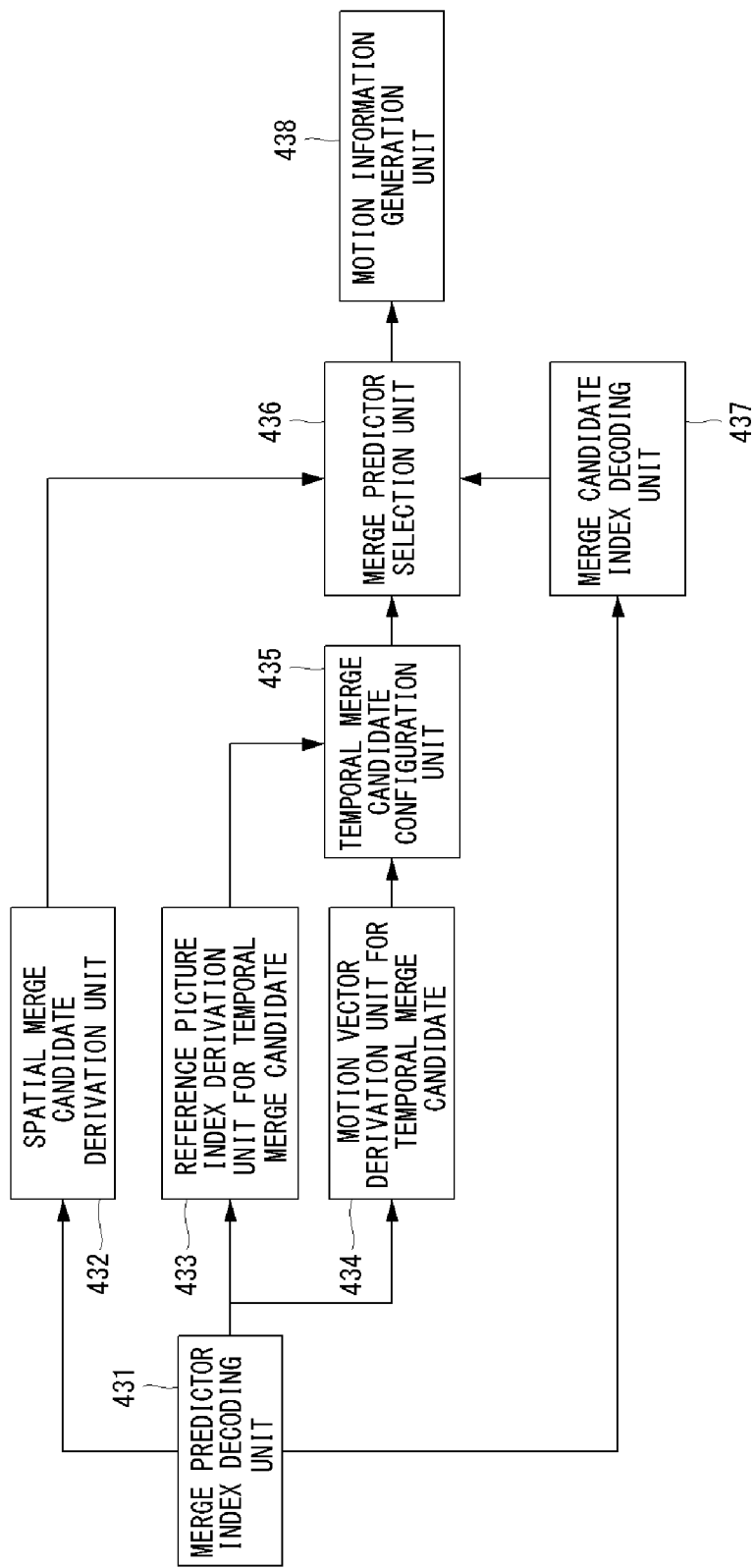
FIG. 7 is a block diagram of a merge mode motion information decoding unit in accordance with a third embodiment of the present invention.

FIG. 7 is a block diagram of the merge mode motion information decoding unit 230 in accordance with a third embodiment of the present invention.

The merge mode motion information decoding unit 230 in accordance with the third embodiment of the present invention further includes a merge candidate generation unit 437 that is added to the configuration of the merge mode motion information decoding unit 230 in accordance with the second embodiment of the present invention. Accordingly, the operations of a merge predictor index decoding unit 431, a spatial merge candidate derivation unit 432, a reference picture index derivation unit 433 for a temporal merge candidate, a motion vector derivation unit 434 for a temporal merge candidate, a temporal merge candidate configuration unit 435, a merge predictor selection unit 436, and a motion information generation unit 438 are the same as those of the second embodiment, and thus a description thereof is omitted.

The merge candidate generation unit 437 can generate a merge candidate when the number of merge candidates is smaller than a predetermined number. In this case, an added merge candidate can be generated by combining motion information of two valid merge candidates. For example, an added merge candidate can be generated by combining the reference picture index of a temporal merge candidate and the valid spatial motion vector of a spatial merge candidate. If a plurality of merge candidates can be generated, the plurality of merge candidates can be added to a list in predetermined order. A merge candidate generated by combining the reference picture index of a temporal merge candidate and the motion vector of a spatial merge candidate can be first added to a list. The number of merge candidates added as described above can be predetermined. If the number of merge candidates to be generated is insufficient, a merge candidate having a motion vector of 0 and a reference picture index of 0 may be added to the list. The predetermined number can be determined for each picture or slice.

The merge predictor selection unit 436 obtains a list of merge candidates using a spatial merge candidate derived by the spatial merge candidate derivation unit 432, a temporal merge candidate generated by the temporal merge candidate configuration unit 435, and merge candidates generated by the merge candidate generation unit 437. If a plurality of merge candidates has the same motion information (i.e., the same motion vector and the same reference picture index), a merge candidate having a lower order of priority is deleted from the list. For example, a predetermined order is order of A, B, Col, C, and D. Here, Col means a temporal merge candidate. However, if one or more of A, B, C, and D are not valid, motion information on a valid block E can be inserted into the position of the first invalid block. Furthermore, the motion information of the valid block E can be inserted into the last position. The merge predictor selection unit 436 selects a merge candidate, corresponding to a merge index reconstructed by the merge predictor index decoding unit 431, from the list of merge candidates and selects the selected merge candidate as the merge predictor of a current block.

Figure 8:
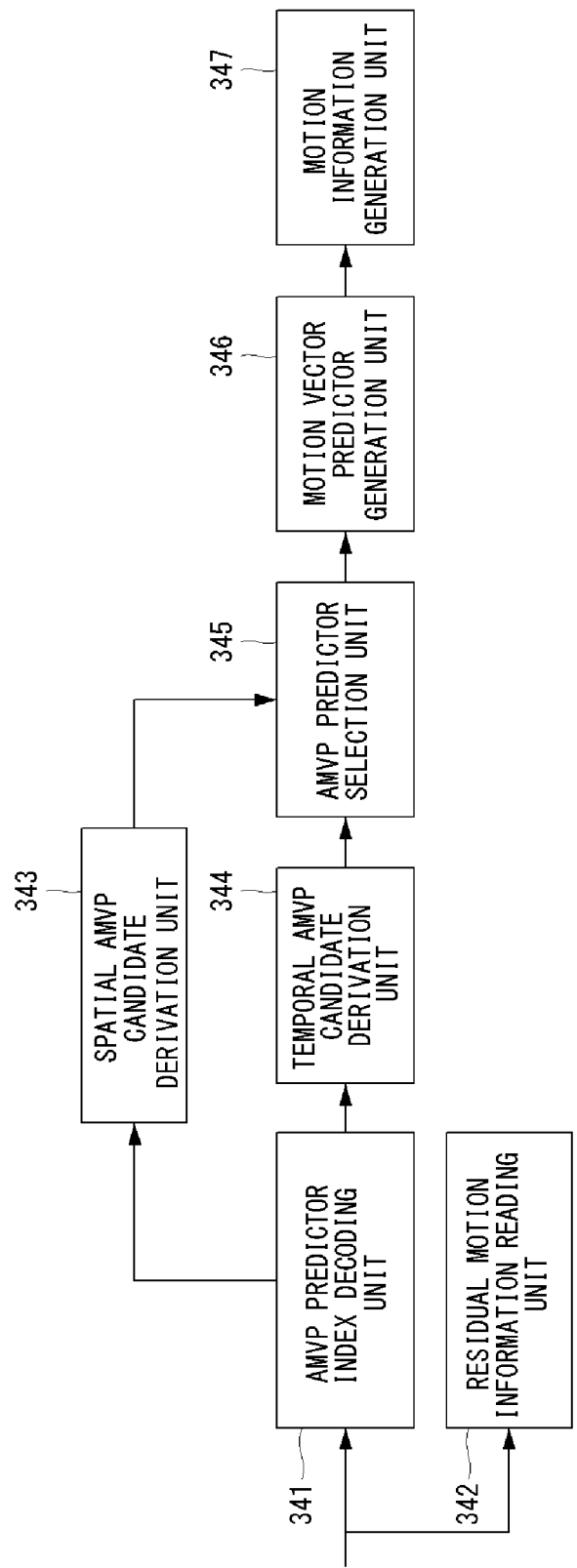
FIG. 8 is a block diagram of an AMVP mode motion information decoding unit in accordance with a first embodiment of the present invention.

FIG. 8 is a block diagram of an AMVP mode motion information decoding unit in accordance with a first embodiment of the present invention.

The AMVP mode motion information decoding unit in accordance with the first embodiment of the present invention includes an AMVP predictor index decoding unit 341, a residual motion information reading unit 342, a spatial AMVP candidate derivation unit 343, a temporal AMVP candidate derivation unit 344, an AMVP predictor selection unit 345, a motion vector predictor generation unit 346, and a motion information generation unit 347. The present embodiment is applied when the number of AMVP candidates is variable.

The AMVP predictor index decoding unit 341 determines whether there is a codeword corresponding to an AMVP predictor index or not. If, as a result of the determination, a codeword corresponding to an AMVP predictor index is determined not to be present, the AMVP predictor index decoding unit 341 determines that one AMVP candidate is present or not present. If an AMVP candidate is determined not to be present, the motion vector predictor generation unit 346 reconstructs a motion vector of 0 into the motion vector of a current block. In contrast, if one AMVP candidate is determined to be present, the motion vector predictor generation unit 346 reconstructs the motion vector of the AMVP candidate into the motion vector of a current block.

The residual motion information reading unit 342 reads the reference picture index and differential motion vector of a current block.

The spatial AMVP candidate derivation unit 343 can select one of the left block (e.g., a block A) and lower left block (e.g., a block D) of a current block as a left spatial candidate and select one of the upper block (e.g., a block B) of the current block, the upper right block (e.g., a block C) of the current block, and the upper left block (e.g., a block E) of the current block as an upper spatial candidate. Here, the motion vector of the first block that is valid when scanning is performed in predetermined order is selected as the candidate. The predetermined order can be order of the block A and the block D or a reverse order thereof in the case of a left block and can be order of the block B, the block C, and the block E or order of the block C, the block B, and the block E in the case of an upper block. The position of the block of the AMVP candidate is identical with the position of the block of a merge candidate.

The temporal AMVP candidate derivation unit 344 obtains a temporal merge candidate using the motion vector of a temporal merge candidate obtained by the motion vector derivation unit 123 of FIG. 2.

The AMVP predictor selection unit 345 generates a list using valid AMVP candidates derived by the spatial AMVP candidate derivation unit 343 and the temporal AMVP candidate derivation unit 344. The AMVP predictor selection unit 345 generates a list of AMVP candidates in predetermined order using the valid AMVP candidates. In this case, if a plurality of AMVP candidates has the same motion vector (here, the plurality of AMVP candidates does not need to have the same reference picture), AMVP candidates having a lower order of priority are deleted from the list. The predetermined order can be order of the left side, the upper side, and Col or can be order of Col, the left side, and the upper side.

Furthermore, the AMVP predictor selection unit 345 selects a decoding table corresponding to the number of valid AMVP candidates within the generated list and selects the AMVP predictor of a current block using the selected decoding table.

The motion vector predictor generation unit 346 determines the motion vector of a candidate, selected by the AMVP predictor selection unit 345, as a motion vector predictor of a current block.

The motion information generation unit 347 generates the motion vector of a current block by adding a motion vector predictor generated by the motion vector generation unit 346 and a differential motion vector read by the residual motion information reading unit 342. Furthermore, the motion information generation unit 347 sets a reference picture index, read by the residual motion information reading unit 342, as the reference picture index of the current block.

Figure 9:
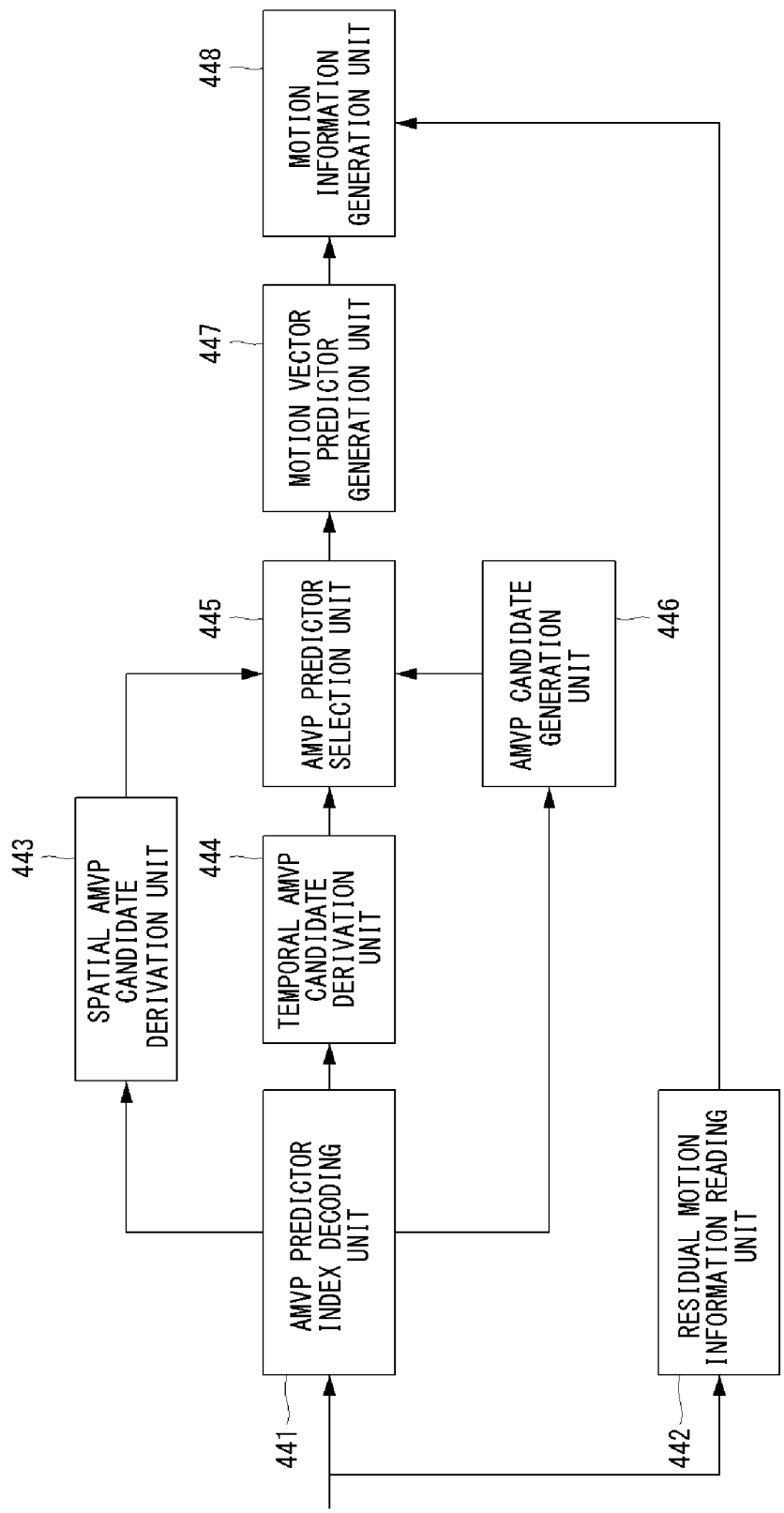
FIG. 9 is a block diagram of an AMVP mode motion information decoding unit in accordance with a second embodiment of the present invention.

FIG. 9 is a block diagram of an AMVP mode motion information decoding unit in accordance with a second embodiment of the present invention.

The AMVP mode motion information decoding unit in accordance with the second embodiment of the present invention includes an AMVP predictor index decoding unit 441, a residual motion information reading unit 442, a spatial AMVP candidate derivation unit 443, a temporal AMVP candidate derivation unit 444, an AMVP predictor selection unit 445, an AMVP candidate generation unit 446, a motion vector predictor generation unit 447, and a motion information generation unit 448. The present embodiment is applied when the number of AMVP candidates is variable.

The operations of the AMVP predictor index decoding unit 441, the residual motion information reading unit 442, the spatial AMVP candidate derivation unit 443, the temporal AMVP candidate derivation unit 444, the AMVP predictor selection unit 445, the motion vector predictor generation unit 447, and the motion information generation unit 448 are the same as those of the respective elements of FIG. 11, and thus a description thereof is omitted.

The AMVP candidate generation unit 446 determines whether it is necessary to generate an AMVP candidate or not. Assuming that the number of AMVP candidates is set to a fixed value in the above AMVP candidate configuration, if the number of valid AMVP candidates is smaller than a fixed value, an AMVP candidate is generated. Furthermore, the generated AMVP candidate is added to a position next to an AMVP candidate having the lowest order of priority in a list. If a plurality of AMVP candidates is sought to be added, the plurality of AMVP candidates is added in predetermined order. The added AMVP candidates can include a candidate having a motion vector of 0.

The AMVP predictor selection unit 445 generates a list of AMVP candidates using a spatial AMVP candidate derived by the spatial AMVP candidate derivation unit 443, a temporal AMVP candidate generated by the temporal AMVP candidate derivation unit 444, and AMVP candidates generated by the AMVP candidate generation unit 446. If a plurality of AMVP candidates has the same motion vector (i.e., the same motion vector and the same reference picture index), AMVP candidates having a lower order of priority are deleted from the list. The predetermined order can be order of the left side, the upper side, and Col or can be order of Col, the left side, and the upper side. Furthermore, a decoding table corresponding to the number of valid AMVP candidates in the generated list is selected, and the AMVP predictor of a current block is selected using the selected decoding table.

Although the some exemplary embodiments of the present invention have been described, a person having ordinary skill in the art will appreciate that the present invention may be modified and changed in various manner without departing from the spirit and scope of the present invention which are written in the claims below.

The invention claimed is:
1. An apparatus for decoding motion information in merge mode, comprising:
a merge predictor index decoding unit configured to reconstruct a merge predictor index of a current block using a received merge codeword;

a spatial merge candidate derivation unit configured to derive spatial merge candidates of the current block;

a temporal merge candidate configuration unit configured to generate a temporal merge candidate of the current block;

a merge candidate generation unit configured to generate one or more merge candidates when the number of valid merge candidates of the current block is smaller than a predetermined number;

a merge predictor selection unit configured to generate a merge candidate list using the merge candidates and select a merge predictor based on the merge predictor index;

a prediction block generating unit configured to generate a prediction block of the current block using motion information of the merge predictor; and a residual block generating unit configured to perform an entropy-decoding process and an inverse-scanning process on residual signals to generate a quantized block, and to perform an inverse-quantizing process and an inverse-transforming process on the quantized block to generate a residual block, wherein the temporal merge candidate configuration unit is configured to set a reference picture index of the temporal merge candidate as 0, and wherein a motion vector of the temporal merge candidate is selected among motion vectors of a first merge candidate block and a second merge candidate block based on a position of the current block within a slice or a largest coding unit, and the motion vector of the second merge candidate block is selected as the motion vector of the temporal merge candidate if the current block is adjacent to a lower boundary of the largest coding unit.

2. The apparatus of claim 1, wherein:

the temporal merge candidate configuration unit determines a temporal merge candidate picture and determines a temporal merge candidate block within the temporal merge candidate picture, in order to generate a motion vector of the temporal merge candidate.

3. The apparatus of claim 2, wherein the temporal merge candidate block is a valid block retrieved when the first candidate block and the second candidate block are searched for in due order, depending on a position of the current block.

4. The apparatus of claim 1, wherein the prediction block generating unit generates a prediction pixel of luminance component using an 8-tap interpolation filter and generates a prediction pixel of chrominance component using a 4-tap interpolation filter.

5. The apparatus of claim 1, wherein a diagonal raster inverse scan is used during the inverse-scanning process.

* * * * *